United States Patent [19]

Colomb et al.

[11] Patent Number: 4,721,884

[45] Date of Patent: Jan. 26, 1988

[54] VACUUM JACKET FOR X-RAY IMAGE INTENSIFIER TUBE

[75] Inventors: Gilbert Colomb, Voiron; Maurice Verat, St. Martin le Vinoux, both of France

[73] Assignee: Thomson-CSF, Paris, France

[21] Appl. No.: 816,715

[22] Filed: Jan. 7, 1986

[30] Foreign Application Priority Data

Jan. 15, 1985 [FR] France ................................ 85 00524

[51] Int. Cl.[4] .......................... H01J 43/28; G01T 1/28

[52] U.S. Cl. .................................... 313/525; 313/523; 445/44

[58] Field of Search ............... 313/523, 525, 541, 420; 445/44; 378/140

[56] References Cited

U.S. PATENT DOCUMENTS 4,153,854 5/1979 Christgau et al. .................. 313/525

OTHER PUBLICATIONS

Patents Abstracts of Japan, vol. 9, No. 8 (E-289) [1731], 12 Jan. 1985; & JP-A-59 158 059 (Shimazu Seisakusho K.K.).

*Primary Examiner*—David K. Moore
*Assistant Examiner*—K. Wieder
*Attorney, Agent, or Firm*—Roland Plottel

[57] ABSTRACT

According to the invention, said jacket has an input port integral with a central ferrous alloy body, which is made from an alloy of aluminium and magnesium of series 5000. This input port is fitted into an aluminium part of series 1000, to which it is welded. The aluminium part is brazed to the central body by aluminium-silicon or aluminium-silicon-magnesium eutectic brazing.

10 Claims, 5 Drawing Figures

VACUUM JACKET FOR X-RAY IMAGE INTENSIFIER TUBE

BACKGROUND OF THE INVENTION

1. FIELD OF THE INVENTION

The present invention relates to a vacuum jacket or envelope for an X-ray image intensifier tube. Vacuum jackets for X-ray image intensifier tubes essentially comprise a central body of revolution, whose ends are terminated by an inlet port or window for the passage of the radiation to be intensified and by an outlet port or window for the visible radiation.

2. DESCRIPTION OF THE PRIOR ART

Up to recent times, the inlet ports were conventionally made from glass, which led to few sealing problems with respect to the central body, even when the latter was partly made from a ferrous metal, because glass-metal seals are well known in the art. However, the use of glass for the inlet ports leads to a certain number of problems. Thus, the absorption of radiation, particularly X-radiation, as well as the diffusion of radiation are very great and increase with the tube size. The use of an inlet glass port consequently leads to a considerable limitation in the performance characteristics of the tube such as the contrast, resolution, etc.

To obviate these disadvantages, it has been proposed to make the inlet ports from a metal which is permeable to the radiation to be intensified. Thus, it has been proposed to produce concave inlet ports from titanium or steel. This inlet port configuration leads to limited metal thicknesses and consequently to ports which are not highly absorbent, but which are still strong enough to withstand atmospheric pressure. A titanium thickness of 250 micrometers permits the transmission of approximately 88% of the X-radiation flux and a stainless steel thickness of 100 micrometers permits the transmission of approximately 88% of the X-radiation flux.

However, the concave shape of these ports leads to various disadvantages when placing under vacuum. As the input screen of the tube is convex for electronic optical requirements, on using a concave port it is necessary to elongate the tube by a quantity equal to the sag or deflection of the input port. However, this sag increases with the size of the input field of the IIT.

The input plane of the tube moves away from the input screen. Due to the conical projection from the focus of the X-ray generator tube, the real input field of the tube, measured in the input plane, is reduced compared with the useful field of the input screen. Finally, due to the projection on to a concave surface, the distortion increases for an equal input field.

It has also been proposed to make the ports from aluminium or an aluminium alloy and with a convex shape. This shape permits a good mechanical strength of the part exposed to atmospheric pressure. For a diameter of 230 mm, its thickness need only be 0.8 mm. Diffusion is then very small and 94% of the X-rays are transmitted. In this case, various procedures have been used for bringing about the sealing of the window or port on to the central body.

Sealing between the port and central body can be brought about by thermocompression welding. Diffusion takes place in the solid state of the aluminium of the port and a metal coating deposited on the ferrous metal of the central body at a temperature below that of their fusion or melting. It is necessary for the contact surfaces to be planar, so that the cylinder-on-cylinder geometry is consequently excluded. In this case, the aluminium alloy or aluminium convex window has an annular peripheral flange and assembly between the port and the body either requires the body to have an annular flange perpendicular to the tube axis, or for a L or S-shaped connecting ring to be used.

Thus, although this technology makes it possible to obtain tubes with an optimized length, it suffers the disadvantage of considerably increasing the overall diameter of the tube. Another disadvantage of this technology is that it is necessary to adjust various parameters, such as the temperature, the mechanical pressure exerted and the contacting time of the parts. This requires time and energy and makes the process expensive to realize and operate on an industrial scale.

Another prior art solution consists of using a convex port with a copper coating applied to an aluminium coating, in which the copper coating is removed in that part subject to the radiation and the aluminium coating is removed from the periphery of a flat part surrounding the convex cup or cap, whilst retaining a local overlap of the two coatings. The copper is then welded by electric arc welding along a lip formed on the central metal body, which can be of stainless steel.

The same problems of the overall diameter of the tube occur here as in the case of thermocompression welding. Moreover, it is difficult to obtain an industrially produced material with two coatings and which still has the same reciprocal adhesion quality with vacuum tightness. Moreover, it is necessary to remove the metal before welding is possible.

SUMMARY OF THE INVENTION

The object of the present invention is to provide a novel vacuum jacket structure for an X-ray image intensifier tube having a port not suffering from the disadvantages of the prior art ports. The present invention also relates to a novel vacuum jacket structure for an X-ray image intensifier tube, which can be produced easily and rapidly.

The present invention relates to a vacuum jacket for an X-ray image intensifier tube having an input port integral with a central ferrous alloy body, wherein the input port is made from an alloy of aluminium and magnesium of series 5000 and is fitted into an aluminium part of series 1000 to which it is welded, said part being brazed to the central body by aluminium-silicon-magnesium or aluminium-silicon eutectic brazing.

BRIEF DESCRIPTION OF THE DRAWINGS

The invention is described in greater detail hereinafter relative to non-limitative embodiments and the attached drawings, wherein show.

In the different drawings, the same references designate the same elements but, for reasons of clarity, the dimensions and proportions of these various elements have not been respected.

DESCRIPTION OF THE PREFERRED EMBODIMENTS

Figure 1:
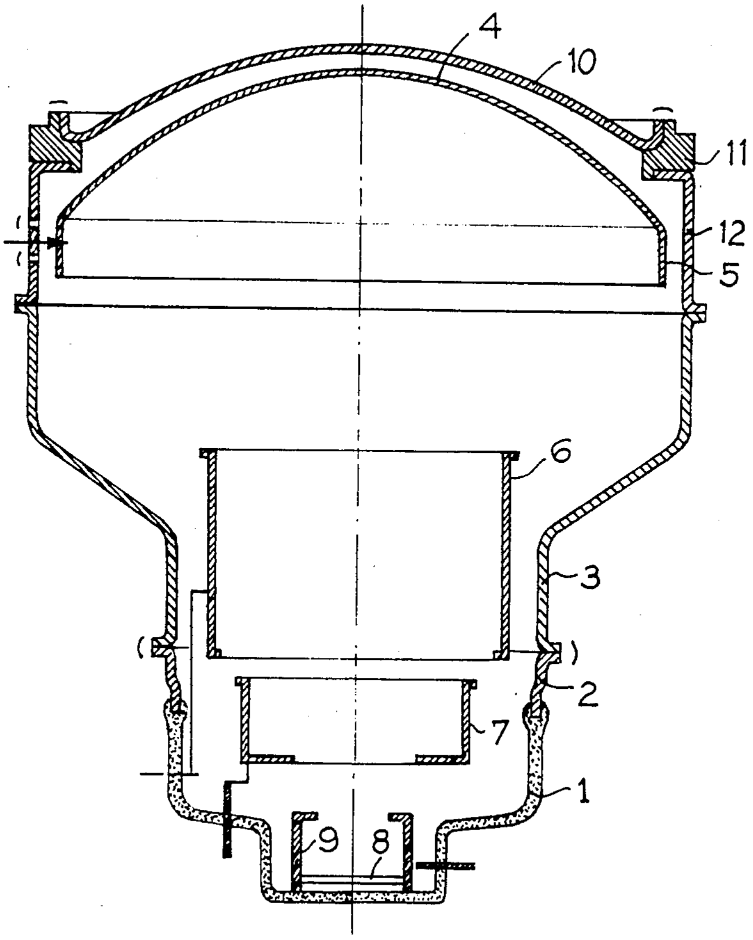
FIG. 1. A longitudinal sectional view of an X-ray image intensifier tube having a vacuum jacket according to an embodiment of the invention.

FIG. 1 is a longitudinal sectional view of an X-ray image intensifier tube having a vacuum jacket in accordance with an embodiment of the invention. Part of the central body of revolution is designated by the reference numeral 1 and is constituted by a glass cylinder, being terminated by a glass output port.

The glass cylinder is welded to an intermediate ring 2, which is made from iron or an iron alloy, preferably an iron-nickel-cobalt alloy such as Dilver or an iron-nickel alloy such as Carpenter.

The intermediate ring serves to facilitate the welding to the glass cylinder, when the remainder of the central body of revolution 3 is of stainless steel. However, it is obvious that parts 2 and 3 can be in one piece when the same material is used.

Within the jacket are diagrammatically shown the main elements constituting the X-ray image intensifier tube, such as the scintillator and photocathode, carrying the reference 4, the accelerating and focussing electrodes 5, 6, 7, the output screen 8 and the final electrode for anode 9.

According to the invention the input port 10 is made from an aluminum and magnesium alloy, i.e. an alloy of aluminum in the "5000" series such as "5086" or "$AG_4$" according to the U.S. Stadard, which also cmprises manganes and chromium. The series in question, like many others, is defined by well-known U.S. standards. These alloys are sufficiently rigid to support the mechanical stresses due to the pressure differences between the inside and outside of the tube. The alloy $AG_4MC$ is the best alloy from the mechanical standpoint for this application.

It is not possible to directly braze port 10 made from an aluminium-magnesium alloy to the ferrous alloy of the central body of revolution, because the melting range of the port, e.g. in the case when it is made from $AG_4MC$ is between 580° and 640° C., i.e. in the brazing range of the 89%Al-Si eutectic, which permits brazing between aluminium and its alloys and ferrous alloys.

Thus, the input port 10 is fitted into a part 11 made from non-allied aluminium of series 1000, such as e.g. 1050 A or A5, according to the U.S. Standards, as can be seen in FIG. 1. Moreover, port 10 and part 11 are welded, e.g. by TIG (Tungsten Inert Gas) welding under alternating current and a helium atmosphere to obtain a good vacuum tightness. FIG. 1 shows that a groove is provided in part 11 to permit the fitting of part 10.

Part 11, which is e.g. of $A_5$ aluminium, can be brazed to a ferrous alloy part 12, which forms part of the central body of the tube. It consists of brazing with an eutectic aluminum compound such as aluminium-silicon eutectic at about 585° C. or aluminium-silicon-magnesium eutectic. This brazing makes it possible to join parts 11 and 12 in a vacuum-tight manner.

Port 10 is then fitted and is welded to part 11. This is followed by the assembly of port 10 and parts 11 and 12 with the remainder of the central ferrous alloy body, e.g. by argon arc welding.

It is also possible to machine part 11, so that port 10 can be fitted into it, whereas parts 11 and 12 are brazed. Machining must take place carefully, so that there is no hazard for the brazing. Part 12 is machined before being brazed to part 11.

Thus, a process for the production of a vacuum jacket according to the invention consists of assembling a type $A_5$ aluminium part 11 with a ferrous alloy part 12. This process is simple, rapid and easily industrialisable.

FIGS. 2 to 5 show several constructional variants of the vacuum jacket according to the invention.

Figure 2:
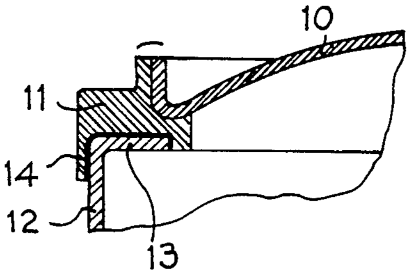
FIGS. 2 to 5 Sectional views illustrating various embodiments of the vacuum jacket according to the invention.

FIG. 2 shows in greater detail the embodiment of FIG. 1. In this case, the type $A_5$ aluminium part 11 is brazed to a substantially cylindrical ferrous alloy part 12 and is terminated by a circular ring 13. The latter is brazed to part 11, which is essentially shaped like a circular ring. This brazing consists of melting a brazing "joint" 14 at an appropriate temperature by known means, e.g. in a furnace, by high frequency losses in the parts to be assembled, by electron bombardment, etc. This melting can take place under a controlled, reducing or neutral atmosphere or under vacuum. This brazing can also be carried out by indirect h.f. induction, as will be described hereinafter.

The two surfaces which are to come into contact receive an aluminium brazing coating. For example, it is possible to use hard solder or brazing with a grain size of 200 micrometers, at a rate of 1 to 1.2 $g/dm^2$ and a flux coating in a 10% water- alcohol mixture, using 1 volume of powder for 2 volumes of liquid, at a rate of 0.8 to 1 $g/dm^2$. The assembly is placed on a metal mandrel surmounted by an asbestos cement support plate and preheating to 180° C. is performed. On the assembly is placed a 0.6 mm thick, ferromagnetic steel disk, which is known as a susceptor. The latter is heated by induction and transmits heat by conduction. It makes it possible to regulate the melting temperature of the aluminium-silicon eutectic by being placed at the Curie point of the material forming it. The brazing or hard soldering operation takes place whilst the assembly is fixed under high pressure. The duration of this pressurization and that of the heating of the susceptor are determined as a function of the dimensions of the parts. On average, the pressurization time exceeds twice the heating time of the susceptor. The temperature is approximately 580° C. At approximately 450° C., the susceptor is removed and the two brazed parts are immersed in water at ambient temperature, so that most of the flux is disengaged. The remainder of the flux is removed by mechanical action and chemical treatment.

It is possible to obviate the use of the difficultly removable brazing flux by carrying out brazing under a vacuum and in this case use is made of a ternary aluminium-silicon-magnesium eutectic.

When brazed the parts undergo various expansions. To give them more flexibility during the brazing operation, it is possible to form recesses or grooves on the parts to be brazed. It is possible to use collars for compensating the expansion differences between the two brazed materials. For example, a part made from the same material as part 12 can be placed against part 11 on the side where it is not in contact with part 12.

Figure 3:
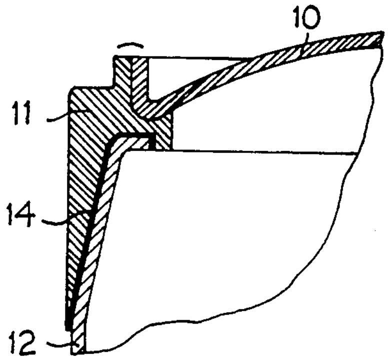
Figure 4:
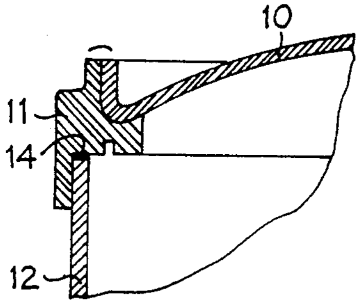
Figure 5:
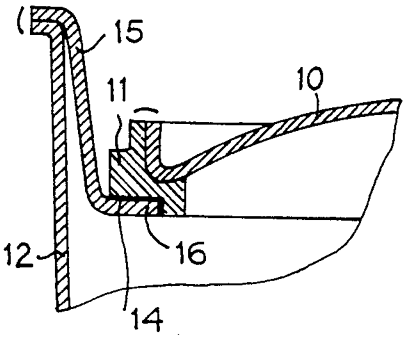

FIGS. 3, 4 and 5 show variants of the jacket according to the invention. The brazing processes referred to hereinbefore can obviously be applied to these variants.

In FIG. 3, part 11 is substantially conical, with a limited slope. The central body is terminated by a substantially conical part 12 with a limited slope. The hard solder or brazing 14 is distributed between the two facing surfaces of the substantially conical parts 11 and 12 with a limited slope.

FIG. 4 relates to a "but brazing". Part 11 is essentially shaped like a circular ring and the central body is terminated by a cylindrical part 12, whereof the end is brazed to part 11.

FIG. 5 shows another variant of the jacket according to the invention, in which part 11 is essentially shaped like a circular ring. The central body is terminated by a substantially cylindrical part 12, to which is welded another substantially cylindrical part 15 terminated by a circular ring 16 brazed to said part 11. This variant makes it possible to carry out brazing without excessively modifying the parts conventionally used for producing intensifiers.

What is claimed is:

1. A vacuum jacket for an X-ray image intensifier tube having an input port made from an alloy of aluminum and magnesium integral with a central ferrous alloy body, wherein an intermediate non allied aluminum part is provided for connecting the input port and the central body, said aluminum part being brazed with an aluminum compound brazing coating to said central ferrous alloy body, and said input port being fitted in said aluminum part and welded to it.

2. A vacuum jacket according to claim 1 wherein said brazing coating is aluminum-silicon eutectic compound.

3. A vacuum jacket according to claim 1 wherein said brazing coating is aluminum-silicon-magnesium eutectic compound.

4. A vacuum jacket according to claim 1 wherein said alloy of aluminum and magnesium further comprises manganese and chroma and is chosen for supporting mechanical stresses due to the pressure differences between the inside and outside of the tube.

5. A vacuum jacket according to claim 1, wherein the intermediate part is made from aluminum comprising at least 99.5% pure aluminum.

6. A vacum jacket according to claim 1, wherein the port and said part are welded by Tungsten Inert gas welding.

7. A vacuum jacket according to claim 1, wherein said part is essentially shaped like a circular ring and wherein the central body is terminated by a substantially cylindrical part, provided with a circular ring, which is brazed to said part.

8. A vacuum jacket according to claim 1, wherein said part has a substantially conical shape and wherein the central body is terminated by a substantially conical part, which is brazed to said part.

9. A vacuum jacket according to claim 1, wherein said part is essentially shaped like a circular ring and wherein the central body is terminated by a substantially cylindrical part, whose end is brazed to said part.

10. A vacuum jacket according to claim 1, wherein said part is essentially shaped like a circular ring and wherein the central body is terminated by a substantially cylindrical part to which is welded another substantially cylindrical part terminted by a circular ring brazed to said part.

* * * * *